US006813481B1

(12) United States Patent
Ide

(10) Patent No.: US 6,813,481 B1
(45) Date of Patent: Nov. 2, 2004

(54) MOBILE RADIO MACHINE

(75) Inventor: Yoshiyuki Ide, Tokyo (JP)

(73) Assignee: NEC Corporation, Tokyo (JP)

( * ) Notice: Subject to any disclaimer, the term of this patent is extended or adjusted under 35 U.S.C. 154(b) by 486 days.

(21) Appl. No.: 09/694,355

(22) Filed: Oct. 24, 2000

(30) Foreign Application Priority Data

Oct. 25, 1999 (JP) .......................................... 11-301870

(51) Int. Cl.$^{7}$ ............................ H04B 1/18; H04B 1/46; H04B 1/034; H04B 1/38; H01Q 1/24; H01Q 1/36

(52) U.S. Cl. ........................... 455/129; 455/80; 455/97; 455/90.3; 455/280; 343/702; 343/895

(58) Field of Search .......................... 455/90.3, 97, 80, 455/129, 107, 280, 281, 282; 343/702, 895

(56) References Cited

U.S. PATENT DOCUMENTS

| | | | | | |
|---|---|---|---|---|---|
| 5,754,141 A | * | 5/1998 | Thompson et al. | ......... | 343/702 |
| 5,801,662 A | | 9/1998 | Itoh | | |
| 5,940,040 A | * | 8/1999 | Koyanagi et al. | ........... | 343/702 |
| 5,982,330 A | * | 11/1999 | Koyanagi et al. | ........... | 343/702 |
| 6,414,638 B1 | * | 7/2002 | Egashira | ..................... | 343/702 |
| 6,526,263 B1 | * | 2/2003 | Saito | ........................... | 455/78 |
| 6,611,691 B1 | * | 8/2003 | Zhou et al. | ................. | 343/709 |

FOREIGN PATENT DOCUMENTS

| | | |
|---|---|---|
| EP | 0 543 645 A1 | 5/1993 |
| EP | 0 722 195 A1 | 7/1996 |
| JP | 61-191636 | 11/1986 |
| JP | 3-179801 | 8/1991 |
| JP | 4-10408 | 1/1992 |
| JP | 6-12850 | 2/1994 |
| JP | 6-140820 | 5/1994 |
| JP | 7-234744 | 9/1995 |
| JP | 2530067 | 6/1996 |
| JP | 2546922 | 8/1996 |
| JP | 10-163733 | 6/1998 |
| WO | WO 97/07557 | 2/1997 |

* cited by examiner

*Primary Examiner*—Vivian Chin
*Assistant Examiner*—Yuwen Pan
(74) *Attorney, Agent, or Firm*—Sughrue Mion, PLLC

(57) ABSTRACT

A mobile radio machine of folding type with simple structure which can receive a pull-out type whip antenna and function as antenna even when the antenna is restored is disclosed.

In the mobile radio machine, when the antenna is pulled out, a change-over circuit 8 connects a radio circuit 12 with an impedance matching circuit 9 and supplies power to a linear antenna element 1 through a feeding terminal 5, so that only the linear antenna element 1 functions as antenna. When the antenna is restored, the change-over circuit 8 connects the radio circuit 12 with an impedance matching circuit 10 and supplies power to a coil antenna element 3 through a feeding terminal 6, and therefore only the coil antenna element 3 functions as antenna. Thus, antenna can be used in a small size, folding type mobile radio machine in simple structure.

15 Claims, 10 Drawing Sheets

MOBILE RADIO MACHINE

FIELD OF THE INVENTION

This invention relates to a mobile radio machine, and more particularly to, a mobile radio machine used as a mobile telephone set or a mobile small computer.

BACKGROUND OF THE INVENTION

FIGS. 1A and 1B are structural diagrams showing a conventional example of mobile radio machine when its antenna is pulled out and restored, respectively. In FIGS. 1A and 1B, a linear antenna (rod antenna) 91 and a coil antenna 93 at the tip portion, which is exclusively used when antenna is restored, are connected in a line and in a state that each being insulated from the other by an insulating member 92 to compose a whip antenna. Also, a feeding terminal 94 is connected via a matching circuit 95 to a radio circuit 96.

In the above conventional mobile radio machine disclosed in Japanese patent application Laid-open No.8-84017 (1996), when antenna is restored, as shown in FIG. 1A, the feeding terminal 94 is connected to the coil antenna 93 for exclusive use in antenna restored time, and the coil antenna 93 operates, while when antenna is pulled out, as shown in FIG. 1B, the feeding terminal 94 is connected to the rod antenna 91, and the rod antenna 91 operates.

However, in the conventional mobile radio machine, depending upon the size of radio machine, the rod antenna 91 can not be restored in its main body. Also, in the case of a folding type mobile radio machine the rod antenna 91 can not be restored in it.

As another conventional example, such a mobile radio machine is known that a lower antenna and an upper antenna are connected to be foldable at the connecting portion, and when pulling out, the lower antenna is pulled out from the main body to compose a rod antenna with the upper antenna, and when restoring, only the lower antenna is restored in the main body and the upper antenna is tilted through 90° from the connected portion composing fulcrum and fixed to an antenna fixing portion on the upper part of the main body (Japanese utility model application laid-open No.4-10408). Also, a mobile radio machine enabled to put a rod antenna element in the main body or pull it outside the main body and rotate such pulled-out antenna to a desired angle is known. (Japanese patent No.2530067).

Also, there is a mobile radio machine in which a linear antenna with long antenna length is enabled to attach to and detach from an connector freely, and in a state that the linear antenna is not attached to the connector, a lay-able type antenna of short antenna length stands uprightly, and when the linear antenna is attached to the connector, the lay-able type antenna is automatically laid in the main body (Japanese patent No.2546922).

Further, a mobile radio machine where a thicker part for the prevention of fall is provided on a part of the main body, and in the thicker part a concave portion capable of receiving a tip of the antenna is formed is known (Japanese utility model application Laid-open No.61-191636).

However, in the conventional mobile radio machine disclosed in Japanese utility model application laid-open No.4-10409 or Japanese patent No.2530067, the lower-part antenna or the rod antenna, though the antenna length itself is shorter than that in former one, is restored in the main body, and therefore the structure is not suitable for a small-size folding type mobile radio machine. In the conventional mobile radio machine disclosed in Japanese patent No.2546923, when using the linear antenna of long length, there is a disadvantage in working efficiency because the work attaching it to the connector is required, and also there is an anxiety that the linear antenna is missing. Further, in the conventional mobile radio machine disclosed in Japanese utility model application Laid-open No.61-191636, though the antenna restoring portion is not provided inside the main body, it is not suitable for a small-size folding type mobile radio machine. Also, the antenna can not function as antenna when it is restored in the concave portion.

Besides, as a conventional mobile radio machine, a mobile radio machine in which an antenna element is enabled to stretch and contract freely, and even when the antenna element is restored, it does not lose the function as radio machine is known (Japanese examined patent publication No.6-12850)

In this conventional mobile radio machine, a feeding point is provided at one position, and when an antenna element is laid, the length is shortened to $\lambda/4$ and the antenna element is used as loop antenna. But, the exact antenna length is not always obtained and varies in some cases. For this reason, a matching circuit connected to a clasp which holds the antenna element when being laid is switched to inductive circuit or capacitive circuit, depending on whether the antenna length is longer or shorter than $\lambda/4$. However, in order to switch the matching circuit connected to the clasp to inductive circuit or capacitive circuit or ground (in case that the antenna length is $\lambda/4$ exactly) according to the antenna length, it is needed to discriminate the antenna length by some method at each time the antenna is laid. Also, the composition of radio machine becomes complicated because, when the antenna is restored, three kinds of matching circuits must be provided corresponding to antenna length and be switched among them.

SUMMARY OF THE INVENTION

Accordingly, it is an object of the invention to provide a mobile radio machine with such structure that an antenna can be used even in a folding-type mobile radio machine by forming the antenna to be lay-able type.

It is a further object of the invention to provide a mobile radio machine with simple structure which can be used as radio machine even when an antenna is restored.

According to the first aspect of the invention, a mobile radio machine, comprises:

an antenna including a linear antenna element which is a lower portion thereof, and a coil antenna element which is an upper portion thereof, the linear and coil antenna elements being separated by an insulating member, and the antenna being rotated on a lowest position thereof to take a standing-up position so that the linear and coil antenna elements are exposed to outside of a main body, and to take a laying-down-position so that the coil antenna element is only exposed to outside of the main body, while the linear antenna element is restored in the main body;

a first feeding terminal for making a contact with the linear antenna element in the standing-up position;

a second feeding terminal for making a contact with the coil antenna element in the laying-down position;

a first impedance matching circuit connected via the first feeding terminal to the linear antenna element;

a second impedance matching circuit connected via the second feeding terminal to the coil antenna element; and a switching circuit for connecting the first impedance matching circuit to a radio circuit, when the antenna takes the standing-up position, and connecting the second impedance matching circuit to the radio circuit, when the antenna takes the laying-down position.

According to the second aspect of the invention, a mobile radio machine with a lay-able type antenna enabled to stand uprightly and be restored in a main body of the radio machine around a rotating shaft provided on a part of the main body, the radio machine comprises:

an antenna which is the lay-able type antenna comprising a first conductive feeding terminal provided with the rotating shaft at its end, a linear antenna element connected at its one end with the first conductive feeding terminal, an insulating member connected with the other end of the linear antenna element, a conductive contact terminal connected with one end of the insulating member, a coil antenna element electrically connected with the other end of the contact terminal and its center axis being located on the extended line of center axis of the linear antenna element;

a switch for detecting whether the antenna being in uprightly standing state or being in restored state;

a second conductive feeding terminal allocated at a position in the main body contacting with the contact terminal when the antenna being restored:

a first impedance matching circuit connecting with the first feeding terminal;

a second impedance matching circuit connecting with the second feeding terminal;

a radio circuit for conducting radio communication; and a change-over circuit for connecting selectively, when the switch detected uprightly standing state of the antenna, the radio circuit with the first impedance matching circuit and making the radio circuit supply power to the first feeding terminal via the first impedance matching circuit, and for connecting selectively, when the switch detected a restored state of the antenna, the radio circuit with the second impedance matching circuit and making the radio circuit supply power to the second feeding terminal via the second impedance matching circuit.

In the mobile radio machine according to the second aspect of the invention, when the antenna stands uprightly, power is supplied to the first feeding terminal so that the linear antenna element is fed and the coil antenna element, which is electrically insulated from the linear antenna element by the insulating member, is not fed. Thus, when antenna stands upright, only the linear antenna element functions as antenna. On the other hand, when antenna is restored, power is supplied to the second feeding terminal so that the coil antenna element is fed and the linear antenna element, which is electrically insulated from the coil antenna element by the insulating member, is not fed. Therefore, when antenna is restored, only the coil antenna functions as antenna.

According to the third aspect of the invention, a mobile radio machine, comprises a meander-line-like inductance element instead of the coil antenna element in the mobile radio machine according to the second aspect of the invention.

In a mobile radio machine according to the third aspect of the invention, when antenna stands upright, only the linear antenna element functions as antenna. And, when antenna is restored, power is supplied to the second feeding terminal, thereby feeding the meander-line-like inductance element, and the linear antenna element is not fed because it is electrically insulated from the meander-line-like inductance element by the insulating member. Therefore, when antenna is restored, only the meander-line-like inductance element functions as antenna.

According to the fourth aspect of the invention, a mobile radio machine with a lay-able type antenna enabled to stand uprightly and be restored in a main body of the radio machine around a rotating shaft provided on a part of the main body, the radio machine comprises:

an antenna which is the lay-able type antenna comprising a first conductive feeding terminal provided with the rotating shaft at its end, a linear antenna element connected at its one end with the first conductive feeding terminal, an insulating member connected with the other end of the linear antenna element, a conductive contact terminal connected with one end of the insulating member, a coil antenna element electrically connected with the other end of the contact terminal and its center axis being located on the extended line of center axis of the linear antenna element;

a second conductive feeding terminal allocated at a position in the main body contacting with the contact terminal when the antenna being restored;

a first impedance matching circuit connected with at least the first feeding terminal;

a second impedance matching circuit connected with at least the second feeding terminal;

a radio circuit for conducting radio communication; and a switch for connecting selectively in its inside, when detected uprightly standing state of the antenna, the radio circuit with the first impedance matching circuit and making power be supplied via the first impedance matching circuit to the first feeding terminal, and for connecting selectively in its inside, when detected a restored state of the antenna, the radio circuit with the second impedance matching circuit and making power be supplied via the second impedance matching circuit to the second feeding terminal.

In the mobile radio machine according to the fourth aspect of the invention, when antenna stands upright, since power is supplied to the first feeding terminal, the linear antenna element is fed, and the coil antenna element, which is electrically insulated from the linear antenna element by the insulating member, is not fed. Therefore, when antenna stands upright, only the linear antenna element functions as antenna. And, when antenna is restored, power is supplied to the second feeding terminal and therefore the coil antenna element is fed, while the linear antenna, which is electrically insulated from the coil antenna element by the insulating member, is not fed. Therefore, when antenna is restored, only the coil antenna functions as antenna.

According to the fifth aspect of the invention, a mobile radio machine, comprises a meander-line-like inductance element instead of the coil antenna element in the mobile radio machine according to the fourth aspect of the invention.

In a mobile radio machine according to the fifth aspect of the invention, when antenna stands upright, only the linear antenna element functions as antenna. On the other hand, when antenna is restored, power is supplied to the second feeding terminal, so that the meander-line-like inductance element is fed and the linear antenna element, which is electrically insulated from the meander-line-like inductance element by the insulating member, is not fed. Thus, when antenna is restored, only the meander-line-like inductance element functions as antenna.

As mentioned above, according to the invention, a whip antenna, in which the linear antenna element and the coil antenna element or the meander-line-like inductance element at the tip of antenna, each being isolated from the other by the insulating member, are connected in a line, is used in a form of lay-able type antenna, so that good electrical characteristic is obtained not only when antenna stands upright (i.e., when pulled out) but also when antenna is restored.

Also, in the invention, since the main body of the radio machine is of folding type and its rotating shaft is formed to rotate, when restoring the antenna, in such a way that the antenna is received in a direction parallel to the direction of folding axis, the antenna can be held without incongruity in appearance even in a folding type radio machine.

BRIEF DESCRIPTION OF THE DRAWINGS

The invention will be described in more detail in conjunction with the appended drawings, wherein.

DETAILED DESCRIPTION OF THE PREFERRED EMBODIMENT

Figure 2:
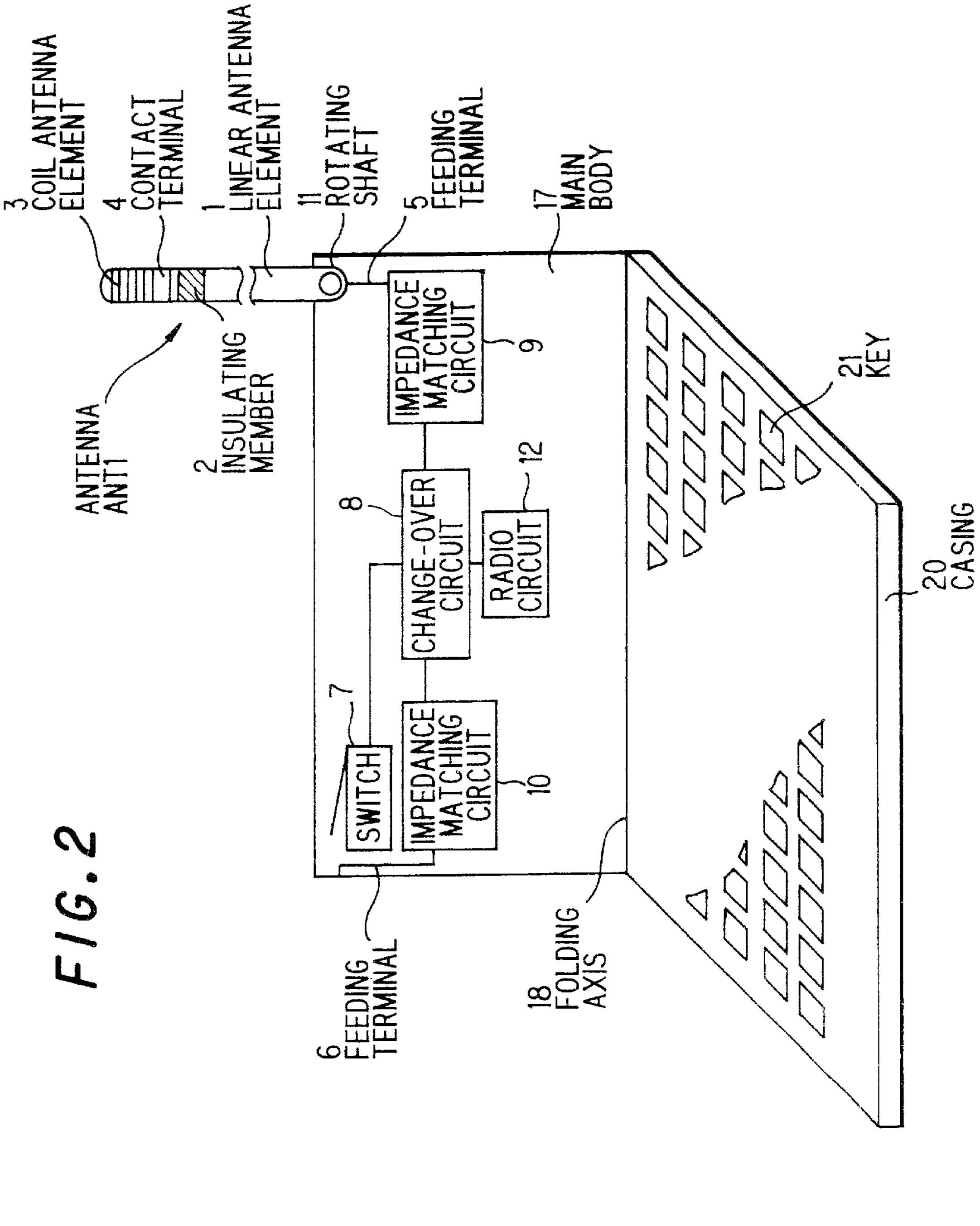
FIG. 2 is a structural diagram showing a mobile radio machine when the antenna is pulled out according to the first embodiment of the invention.
Figure 3:
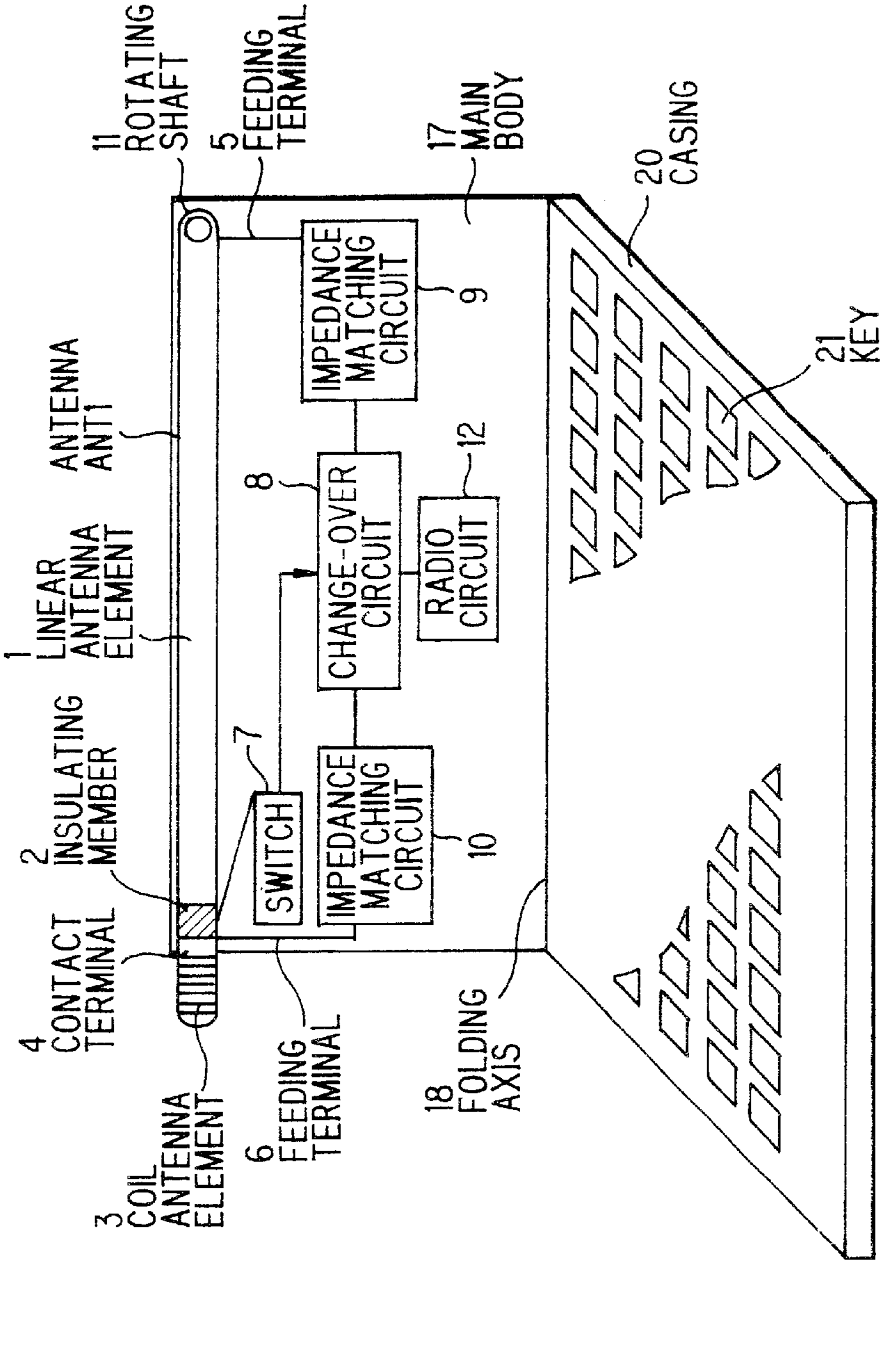
FIG. 3 is a structural diagram showing a mobile radio machine when the antenna is restored according to the first embodiment of the invention.

A preferred embodiment of the invention will be explained in details below referring to the drawings. FIG. 2 is a structural diagram showing a mobile radio machine when antenna is pulled out according to the first embodiment of the invention, and FIG. 3 shows briefly the same mobile radio machine when antenna is restored. In both figures, the same component parts are indicated by the same reference numerals. The mobile radio machine shown in FIG. 2 and FIG. 3 is of folding type.

In the first embodiment shown in FIG. 2 and FIG. 3, an antenna ANT1 comprises a linear antenna element 1, an insulating member 2 one end of which is connected to one end of the linear antenna element 1, a conductive contact terminal 4 one end of which is connected to the other end of the insulating member 2, a coil antenna element 3 electrically connected to the other end of the contact terminal 4, and a feeding terminal 5 provided at the other end of the linear antenna element 1. The center axis of the coil antenna element 3 is formed to be coincident with the extended line of the center axis of the linear antenna element 1. The linear antenna element 1 and the coil antenna element 3 are electrically insulated by the insulating member 2.

The antenna ANT1 is provided with a rotating shaft 11 at the other end of the linear antenna element 1 corresponding to a fringe of the main body 17 of the mobile radio machine, and is structured to be able to move freely around the rotating shaft 11. When the antenna ANT1 is pulled out, as shown in FIG. 2, the antenna ANT1 is moved around the rotating shaft 11 such that it crosses the upper edge of the main body 17 almost at a right angle (i.e., so as to stand uprightly). When the antenna ANT1 is restored, as shown in FIG. 3, the antenna ANT1 is laid around the rotating shaft 11 so as to become horizontal to the upper edge of the main body 17. Meanwhile, in the casing 20, a telephone set circuit or a small computer system may be contained, and a predetermined number of keys 21 are provided thereon.

As shown in FIG. 3, the feeding terminal 6 is allocated at a location on the main body 17 which contacts with the contact terminal 4 when the antenna ANT1 is restored. Also, a switch 7 provided in the main body 17 becomes on when the antenna ANT1 is restored because its actuator is pushed by a part of antenna around the insulating member 2, while the switch 7 becomes off when the antenna ANT1 is pulled out because the pushing pressure against the actuator is released.

A change-over circuit 8 connects a radio circuit 12 to an impedance matching circuit 9 or 10 in accordance with on/off of the switch 7. The impedance matching circuit 9 is connected to the feeding terminal 5, and the impedance matching circuit 10 is connected to the feeding terminal 6.

In operation, when antenna is pulled out, as shown in FIG. 2, the antenna ANT1 is moved to stand uprightly, by which the switch 7 is turned off. Then, the change-over circuit 8 connects the radio circuit 12 with the impedance matching circuit 9. This makes the radio circuit 12 supply power to the linear antenna element 1, via the change-over circuit 8 and the impedance matching circuit 9, from the feeding terminal 5 connected to the rotating shaft 11. The linear antenna element 1 is insulated from the coil antenna element 3 by the insulating member 2, and therefore, when antenna is pulled out, only the linear antenna element 1 functions as antenna.

Next, when antenna is restored, as shown in FIG. 3, the antenna ANT1 is laid horizontally, the actuator of the switch 7 is pushed by the antenna ANT1 and becomes on, so that the change-over circuit 8 connects the radio circuit 12 with the impedance matching circuit 10. By this operation, the radio circuit 12 supplies power to the feeding terminal 6 via the change-over circuit 8 and the impedance matching circuit 10 and further through the feeding terminal 6 to the contact terminal 4 connected to the coil antenna element 3.

The contact terminal 4 is insulated from the linear antenna element 1 by the insulating member 2, and therefore the linear antenna element 1 is not fed. Thus, when antenna is restored, only the coil antenna element 3 functions as antenna.

Figure 1A:
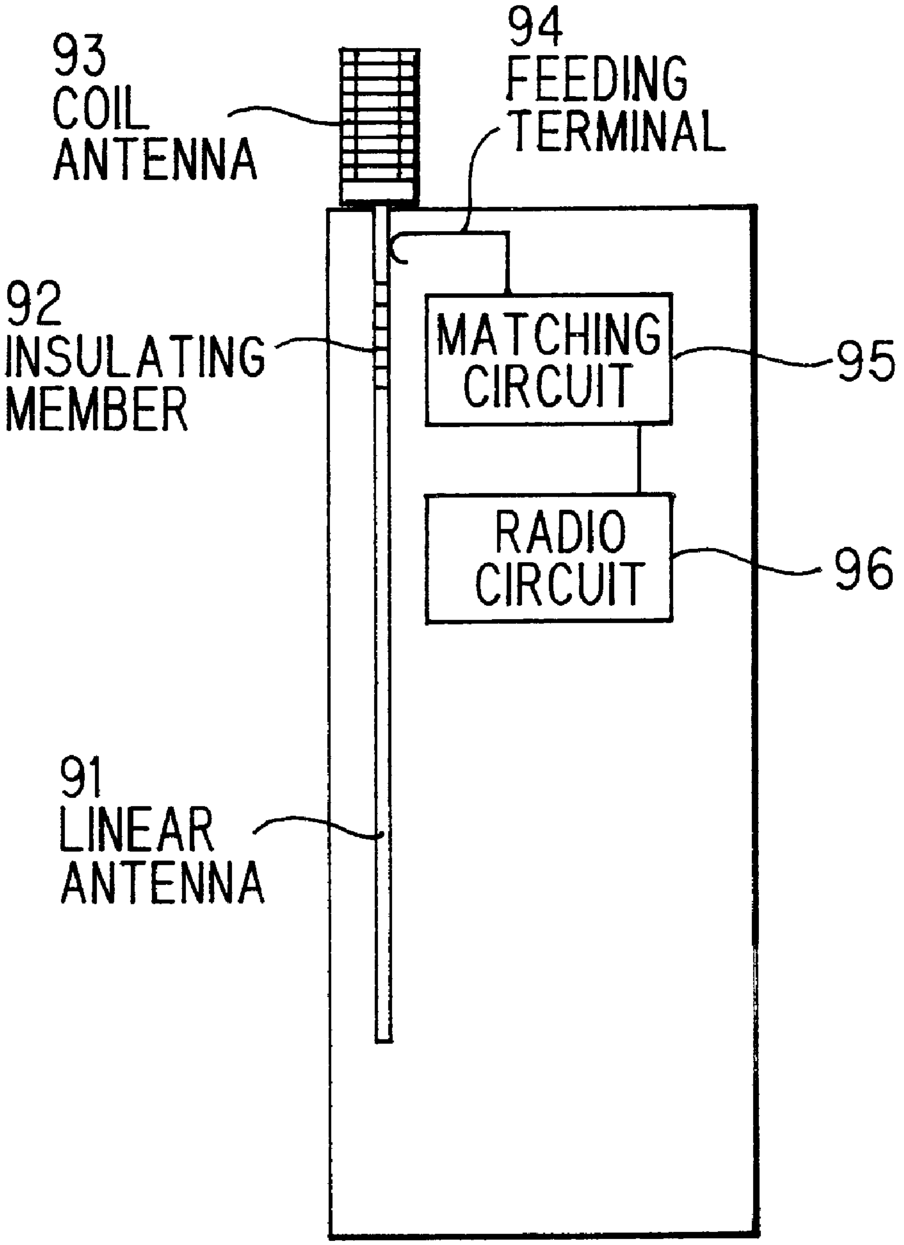
FIG. 1A PRIOR ART
FIGS. 1A and 1B are structural diagrams showing a conventional mobile radio machine.
Figure 1B:
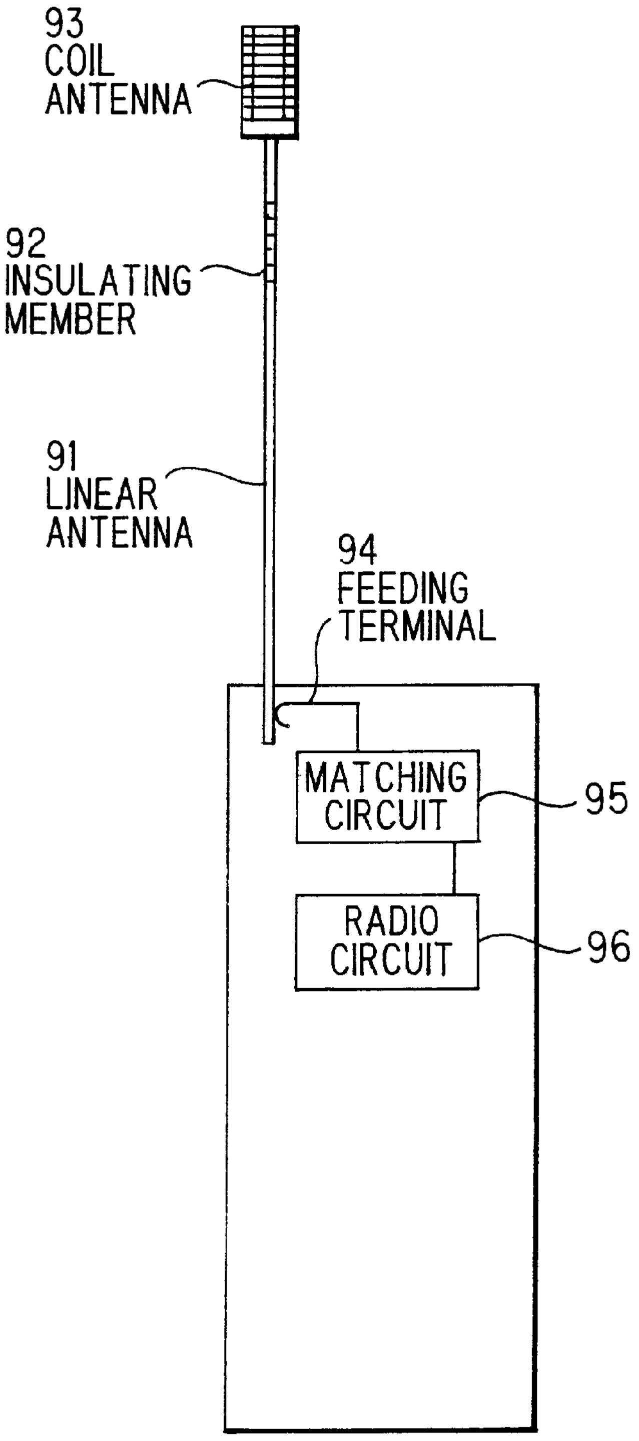
FIG. 1B PRIOR ART

As mentioned above, in this embodiment, the antenna ANT1 is restored in a direction parallel to the folding axis which is formed when the mobile radio machine is folded into two (horizontal direction in FIG. 1 and FIG. 2 ), so that the antenna ANT1 can be restored even in a folding type mobile radio machine in which a conventional whip antenna can not be restored. In addition, in this antenna restored state, the coil antenna element 3 can be made to function. Also, since the antenna length of the coil antenna element 3 is fixed, the matching circuit required when the antenna is restored is only one circuit of the impedance matching circuit 10, and therefore accurate electrical characteristic can be obtained in more simplified structure than that of conventional mobile radio machine.

Further, in case that the radio machine, as is the case with general pocket telephone, is used in such manner as putting its main body to head of human body, the antenna ANT1 keeps a distance from head even when the main body 17 of the mobile radio machine is inclined for phone call in a state that the antenna is pulled out. Therefore, optimum antenna angle to phone call can be obtained.

Next, the second embodiment of the invention is explained.

Figure 4:
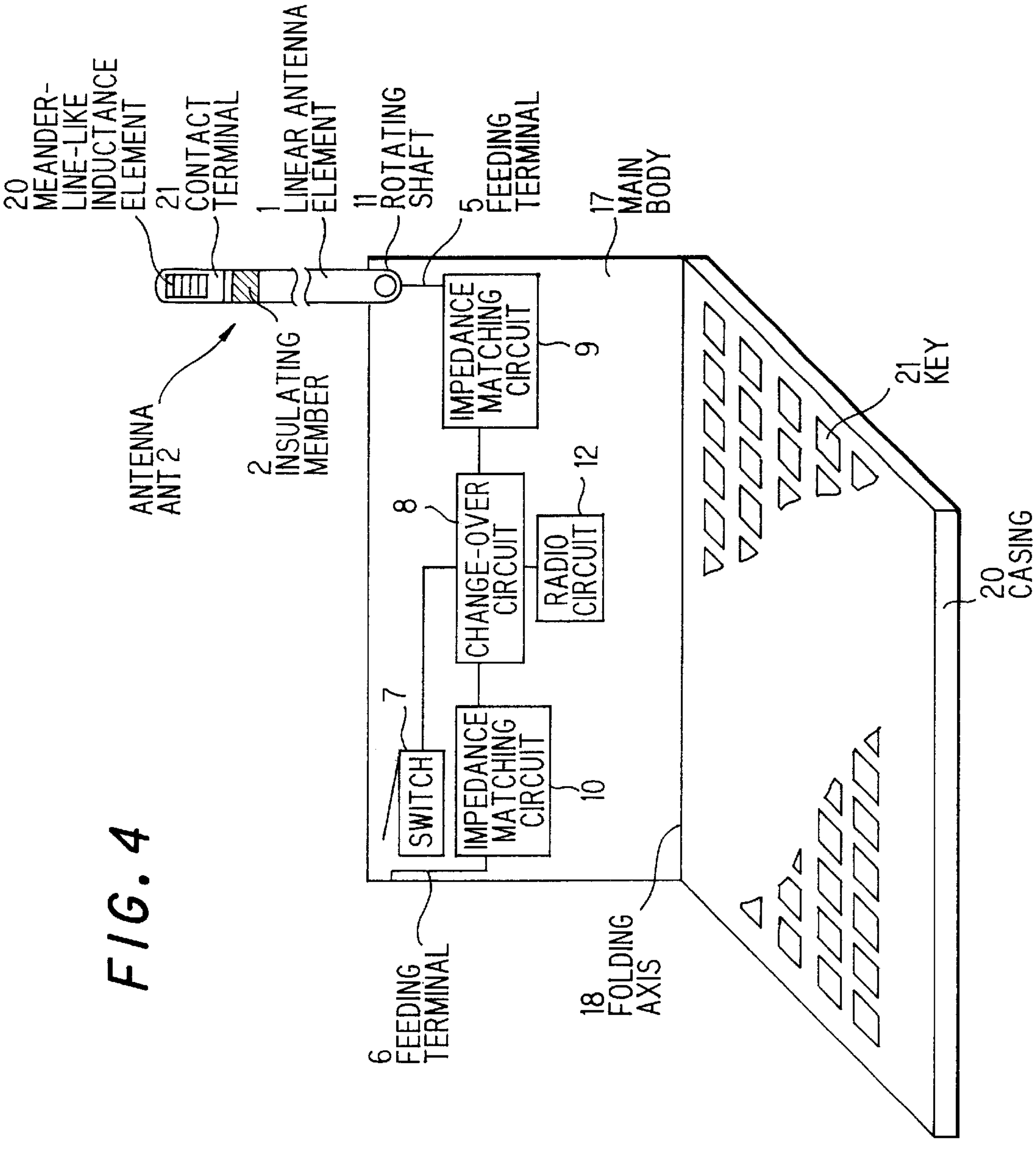
FIG. 4 is a structural diagram showing a mobile radio machine when the antenna is pulled out according to the second embodiment of the invention.
Figure 5:
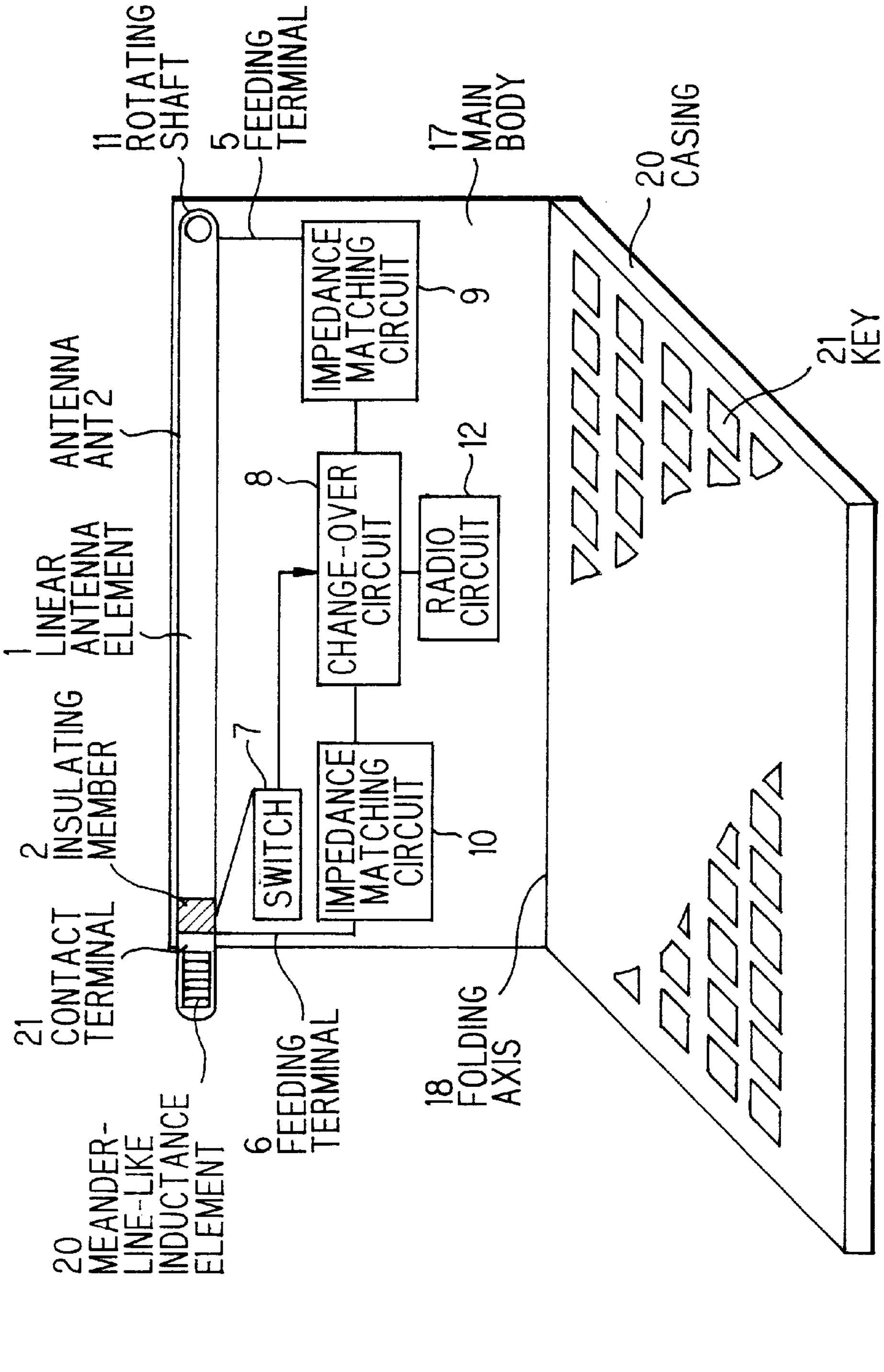
FIG. 5 is a structural diagram showing a mobile radio machine when the antenna is restored according to the second embodiment of the invention.

FIG. 4 is a structural diagram showing a mobile radio machine when antenna is pulled out according to the second embodiment of the invention. FIG. 5 shows briefly the same mobile radio machine when antenna is restored. In both figures, the same component parts are indicated by the same reference numerals. Also, component parts like those in FIG. 2 and FIG. 3 are indicated using the same reference numerals and explanation thereon is omitted. The mobile radio machine in FIG. 4 and FIG. 5 is of folding type.

In the second embodiment shown in FIG. 4 and FIG. 5, an antenna ANT2 comprises a linear antenna element 1, an insulating member 2 one end of which is connected to one end of the linear antenna element 1, a conductive contact terminal 21 one end of which is connected to the other end of the insulating member 2, a meander-line-like inductance element 20 electrically connected to the other end of the contact terminal 21, and a feeding terminal 5 provided at the other end of the linear antenna element 1.

The center axis of the meander-line-like inductance element 20 is formed to be coincident with the extended line of the center axis of the linear antenna element 1. The linear antenna element 1 and the meander-line-like inductance element 20 are electrically isolated by the insulating member 2.

In operation, when antenna is pulled out, as shown in FIG. 4, the antenna ANT2 is moved to stand uprightly, thereby making the switch 7 off. Then, the radio circuit 12 and the impedance matching circuit 9 are connected by the change-over circuit, and power is supplied to the linear antenna element 1 through the feeding terminal 5 connected to the rotating shaft 11. The meander-line-like inductance element 20 is insulated from the linear antenna element 1 by the insulating member 2, and therefore when antenna is pulled out, the antenna ANT2 functions as the linear antenna 1.

On the other hand, when antenna is restored, as shown in FIG. 5, the antenna ANT2 is laid horizontally to push the actuator of the switch 7 to become on, and therefore the change-over circuit 8 is connected to the radio circuit 12 and the impedance matching circuit 10. By this operation, power is supplied through the feeding terminal 6 to the contact terminal 21 connected to the meander-line—like inductance element 20.

The contact terminal 21 is insulated from the linear antenna 1 by the insulating member 2, and therefore the linear antenna element 1 is not fed. Thus, when antenna is restored, the meander-line-like inductance element 20 functions as antenna. In this embodiment also, the antenna ANT2, like the first embodiment, is of such structure as enabled to lay toward the main body 17, and has the same characteristic as that in the first embodiment.

Figure 6:
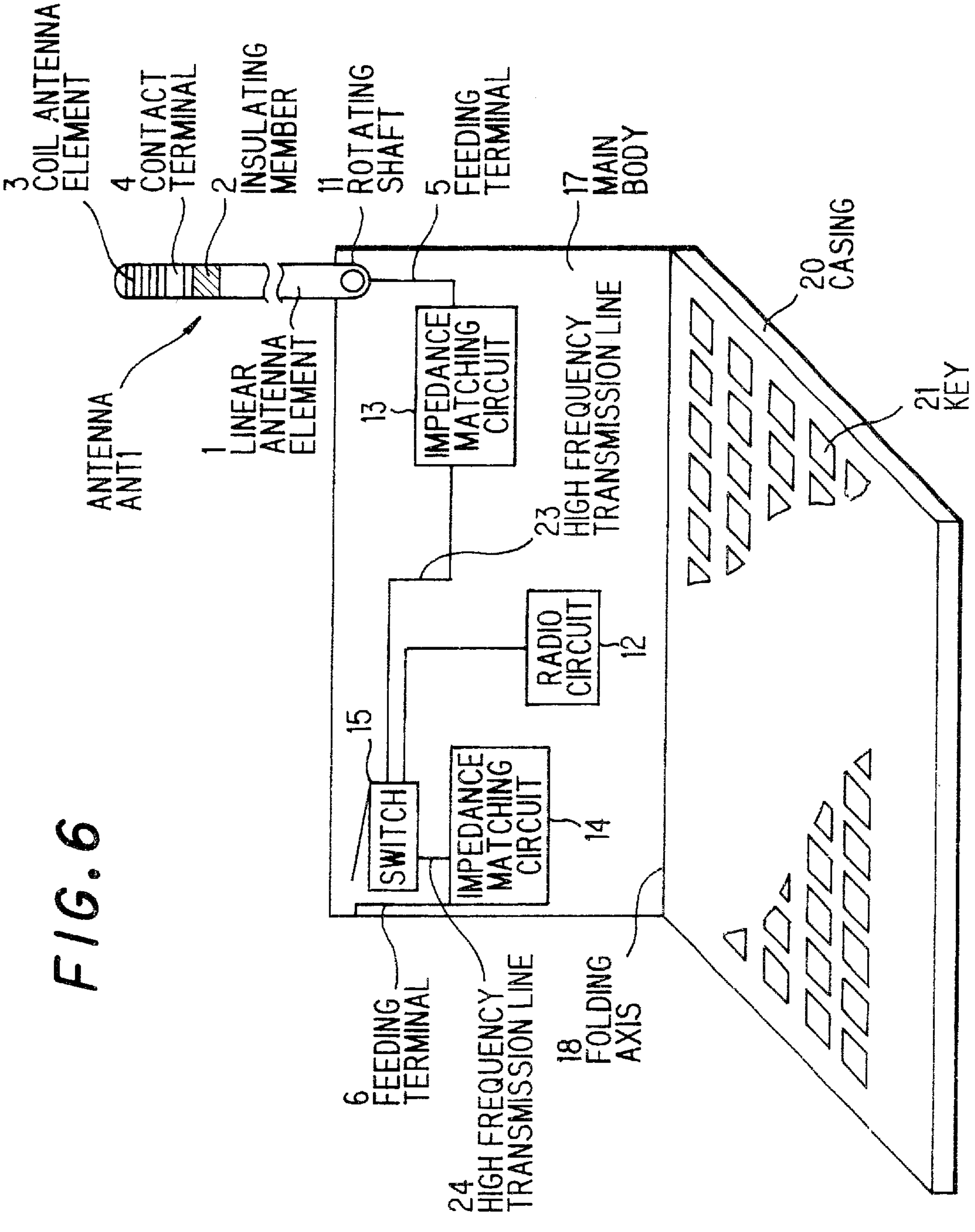
FIG. 6 is a structural diagram showing a mobile radio machine when the antenna is pulled out according to the third embodiment of the invention.
Figure 7:
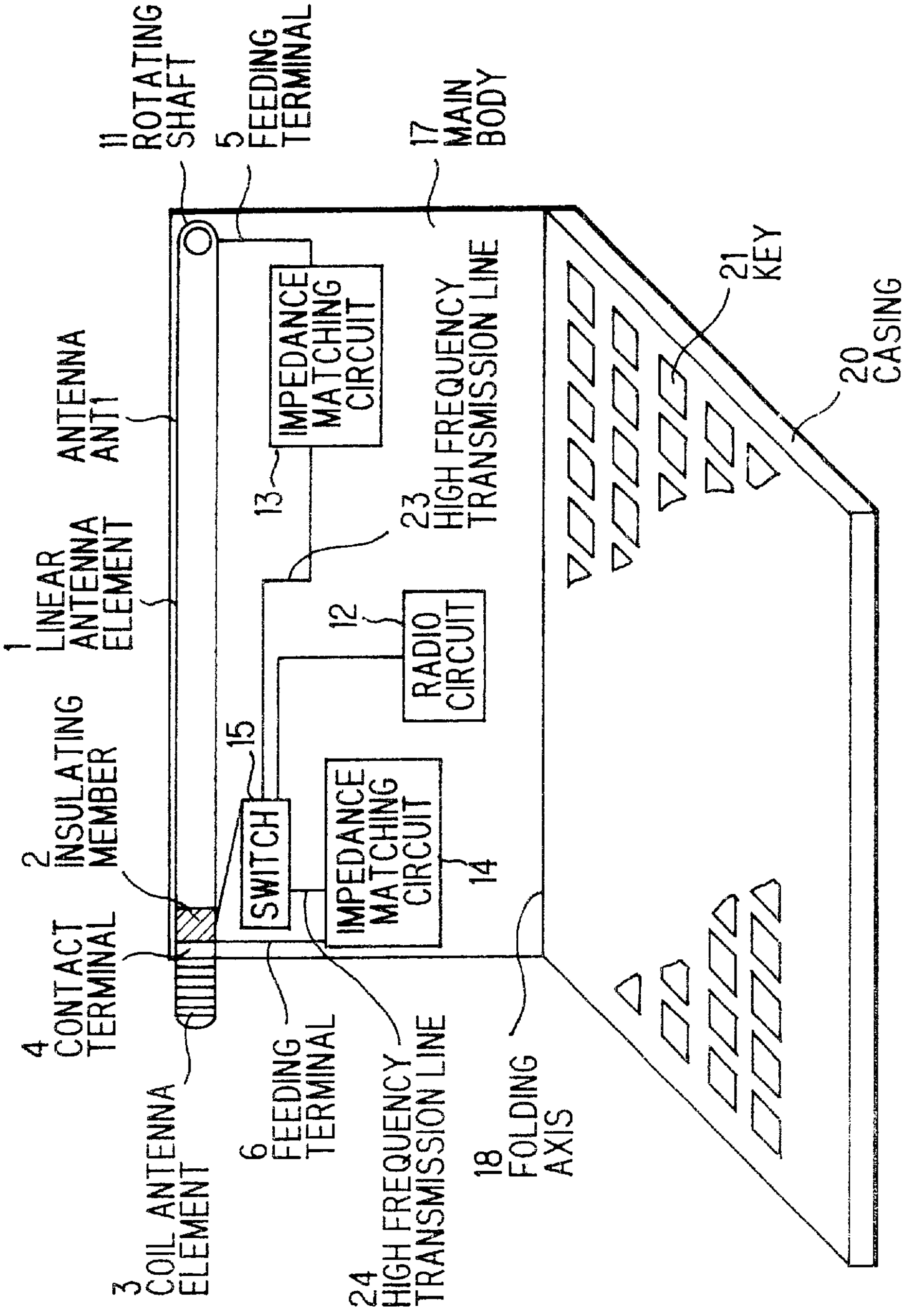
FIG. 7 is a structural diagram showing a mobile radio machine when the antenna is restored according to the third embodiment of the invention.

Next, the third embodiment of the invention is explained. FIG. 6 is a structural diagram showing a mobile radio machine when antenna is pulled out according to the third embodiment of the invention. FIG. 7 shows briefly the same mobile radio machine when antenna is restored. In both figures, the same component parts are indicated by the same reference numerals. Also, component parts like those in FIG. 2 are indicated using the same reference numerals and their explanation is omitted. The mobile radio machine in FIG. 6 and FIG. 7 is of folding type.

In the third embodiment shown in FIG. 6 and FIG. 7, an antenna ANT1 has the same structure as the antenna ANT1 in the first embodiment, but the connecting form of impedance matching circuits 13 and 14 with a switch 15 differs from that in the first embodiment. Namely, the impedance matching circuit 13, while on one hand is connected to the feeding terminal 5, on the other hand is connected via a high frequency transmission line 23 to the switch 15. Also, the impedance matching circuit 14 is connected to the feeding terminal 6 and to the switch 15 via a high frequency transmission line 24. Further, the switch 15 is connected with the radio circuit 12.

As shown in FIG. 7, the switch 15 provided in the main body 17, when the antenna ANT1 is restored, becomes on due to that the actuator is pushed by a part of antenna around the insulating member 2, and when the antenna ANT1 is pulled out, as shown in FIG. 6, becomes off because the pushing pressure against the actuator. Is released.

In operation, when antenna is pulled out, as shown in FIG. 6. the antenna ANT1 is moved to stand uprightly, so that pushing pressure against the actuator is released and the switch 15 becomes off. Then, the switch 15 connects mechanically in its inside the radio circuit 12 and the high frequency transmission circuit 23, and this makes the radio circuit 12 supply power via the high frequency transmission circuit 23 and the impedance matching circuit 13 to the feeding terminal 5 connected to the rotating shaft 11. Therefore, when antenna is pulled out, the linear antenna element 1, which is insulated from the coil antenna element 3 by the insulating member 2, functions as antenna.

When antenna is restored, as shown in FIG. 7, the antenna ANT1 is laid horizontally to push the actuator, thereby making the switch 15 on. Then, the switch 15 connects mechanically in its inside the radio circuit 12 with the high frequency transmission circuit 24. This makes the radio circuit 12 supply power to the feeding terminal 6 via the high frequency transmission circuit 24 and the impedance matching circuit 14. By this power supplying to the feeding terminal 6, the contact terminal 4 connected to the coil antenna element 3 is fed.

The contact terminal 4 is insulated from the linear antenna 1 by the insulating member 2, and therefore the linear antenna element 1 is not fed. Thus, when antenna is restored, the coil antenna element 3 functions as antenna. In this embodiment also, the same characteristic as those in the first and second embodiments can be obtained.

Next, the fourth embodiment of the invention is explained. FIG. 9 is a structural diagram showing a mobile radio machine when antenna is pulled out according to the fourth embodiment of the invention. FIG. 9 shows briefly the same mobile radio machine when antenna is restored. In both figures, the same component parts are indicated by the same reference numerals. Also, component parts like those in FIG. 3 are indicated using the same reference numerals and explanation thereon is omitted. The mobile radio machine in FIG. 8 and FIG. 9 are of folding type.

Figure 8:
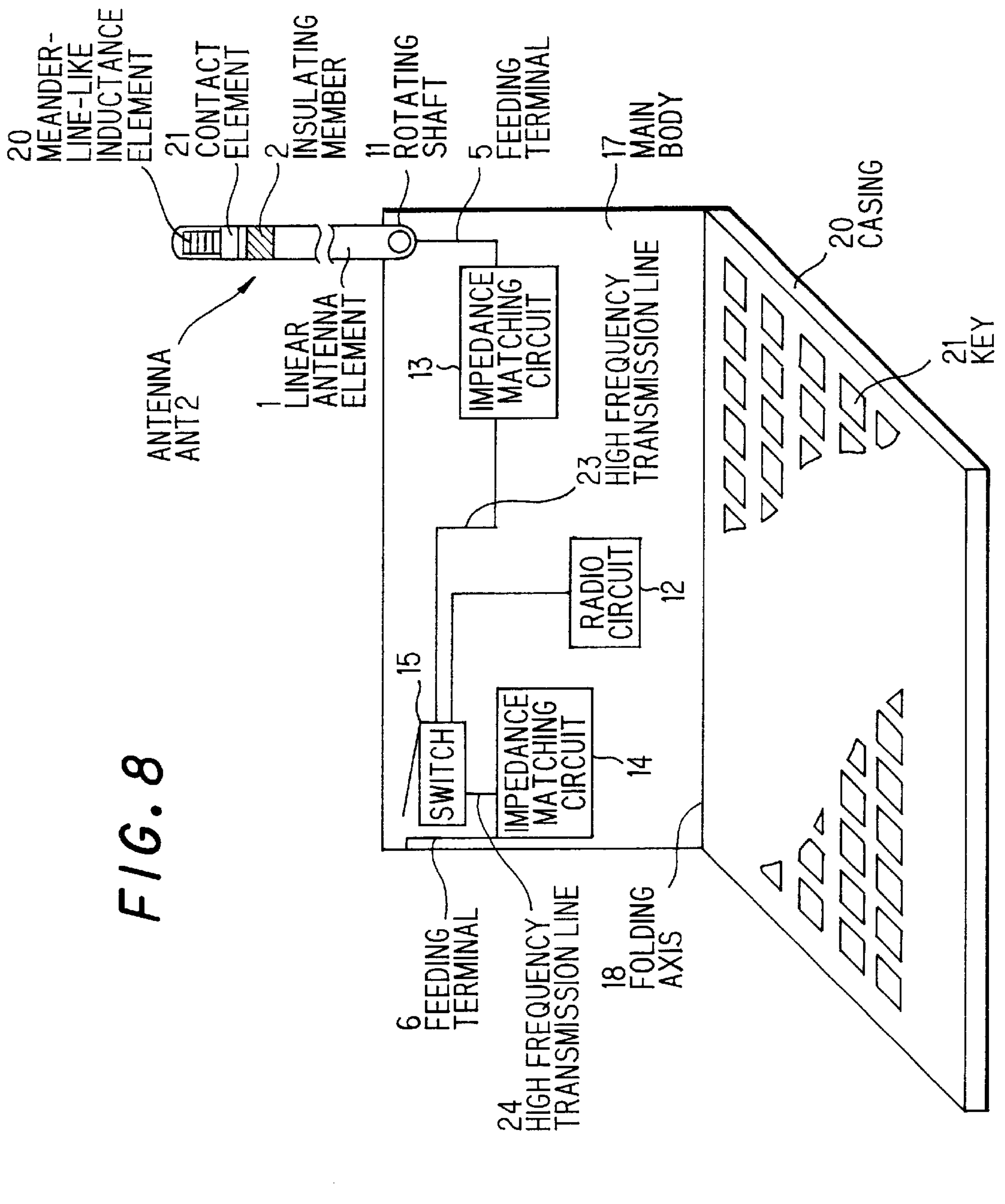
FIG. 8 is a structural diagram showing a mobile radio machine when the antenna is pulled out according to the fourth embodiment of the invention.
Figure 9:
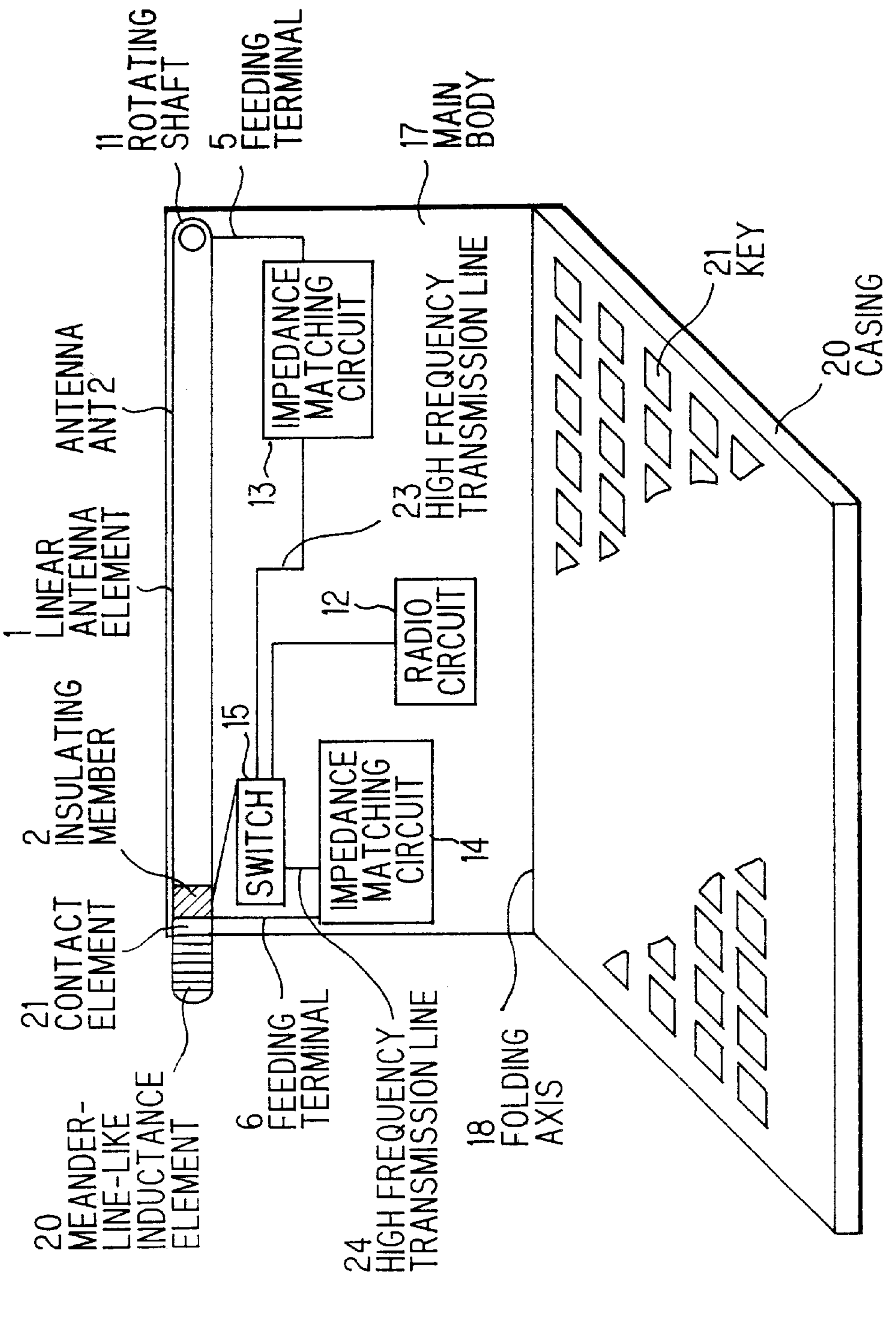
FIG. 9 is a structural diagram showing a mobile radio machine when the antenna is restored according to the fourth embodiment of the invention.

In the fourth embodiment shown in FIG. 8 and FIG. 9, an antenna ANT2 has the same structure as the antenna ANT2 in the second embodiment, but the connecting form of an impedance matching circuits 13 and 14 with a switch 15 differs from that in the second embodiment. Namely, the impedance matching circuit 13, while on one hand is connected to the feeding terminal 5, on the other hand is connected via a high frequency transmission line 23 to the switch 15. Also, the impedance matching circuit 14 is connected to the feeding terminal 6 and to the switch 15 via a high frequency transmission line 24. Further, the switch 15 is connected with a radio circuit 12.

In operation, when antenna is pulled out, as shown in FIG. 8, the antenna ANT2 is moved to stand uprightly, so that pushing pressure against the actuator is released and the switch 15 becomes off. By this operation, the switch 15, in its inside, connects mechanically the radio circuit 12 with the high frequency transmission circuit 23, thereby the radio circuit 12 supplying power via the high frequency transmission circuit 23 and the impedance matching circuit 13 to the feeding terminal 5 connected to the rotating shaft 11. Therefore, when antenna is pulled out, the linear antenna element 1, which is insulated from the meander-line-like antenna element 20 by the insulating member 2, functions as antenna.

When the antenna is restored, as shown in FIG. 9, the antenna ANT2 is laid horizontally and pushes the actuator to make the switch 15 on. Then, the switch 15, in its inside, connects the radio circuit 12 with the high frequency transmission circuit 24. This makes the radio circuit 12 supply power to the feeding terminal 6 via the high frequency transmission circuit 24 and the impedance matching circuit 14. By the power supplying to the feeding terminal 6, the contact terminal 21 connected to the meander-line-like inductance element 20 is fed.

The contact terminal 21 is insulated from the linear antenna 1 by the insulating member 2, and therefore the linear antenna element 1 is not fed. Thus, when antenna is restored, the meander-line-like inductance element 20 to which power is supplied through the contact terminal 21 functions as antenna. In this embodiment also, the same characteristic as those in the first to third embodiments can be obtained.

As explained in the above, according to the invention, the whip antenna, in which the linear antenna element and the coil antenna element or the meander-line-like inductance element positioned at the tip of antenna are connected in a line and insulated from each other by the insulating member, is used as lay-able type antenna, so that good electrical characteristic is obtained not only when antenna stands uprightly (antenna pulled-out time) but also when antenna is restored. Accordingly, even in a mobile radio machine having folding structure which can not restore a conventional pull-out type whip antenna, antenna can function, when antenna stands uprightly, as linear antenna and when being restored, as coil antenna.

Also, according to the invention, the antenna length of the coil antenna element or the meander-line-like inductance element is fixed, so that the impedance matching circuit required when antenna is restored is only one circuit. Accordingly, a mobile radio machine with more simplified structure than conventional one and being capable of making radio communication even when the antenna is restored can be obtained.

Further, according to the invention, in case that the mobile radio machine is used, like a general pocket telephone, in such way as putting it to head of human body, even if the main body of the radio machine whose antenna is pulled out is inclined for phone call, the antenna itself keeps a distance from human head, and therefore optimum antenna angle to phone call can be obtained.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within meets and bounds of the claims, or equivalence of such meets and bounds are therefore intended to be embraced by the claims.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. A mobile radio machine, comprising:

an antenna including a linear antenna element which is a lower portion of the antenna, and a coil antenna element which is an upper portion of the antenna, said linear and coil antenna elements being separated and electrically isolated from one another by an insulating member, and said antenna being rotated on a lowest position thereof to take a standing-up position so that said linear and coil antenna elements are exposed to outside of a main body, and to take a laying-down-position so that said coil antenna element is only exposed to outside of said main body, while said linear antenna element is restored in said main body;

a first feeding terminal for making a contact with said linear antenna element when said antenna is in said standing-up position;

a second feeding terminal for making a contact with said coil antenna element when said antenna is in said laying-down position;

a first impedance matching circuit connected via said first feeding terminal to said linear antenna element;

a second impedance matching circuit connected via said second feeding terminal to said coil antenna element; and a switching circuit for connecting said first impedance matching circuit to a radio circuit, when said antenna takes said standing-up position, and connecting said second impedance matching circuit to said radio circuit, when said antenna takes said laying-down position.

2. A mobile radio machine, according to claim 1, further comprising a switch, wherein:

said switch is of such structure that, when said antenna is restored, said switch becomes on by pressure pushed by a part of said antenna against its actuator, and when said antenna stands uprightly, said switch becomes off by release of said pushing pressure against said actuator.

3. A mobile radio machine, according to claim 1, further comprising a rotation shaft, wherein: said main body of radio machine is that of a folding type radio machine, and said rotation shaft rotates so that said antenna is restored, in a direction parallel to the direction of a folding axis of said radio machine.

4. A mobile radio machine with a lay-able type antenna enabled to stand uprightly and be restored in a main body of said radio machine around a rotating shaft provided on a part of said main body, said radio machine comprising:

an antenna which is said lay-able type antenna comprising a first conductive feeding terminal provided with said rotating shaft at an end of the first conductive feeding terminal, a linear antenna element connected at one end of said linear antenna element with said first conductive feeding terminal, an insulating member connected at one end of said insulating member with the other end of said linear antenna element, a conductive contact terminal having one end of the conductive contact terminal connected with the other end of said insulating member, and a coil antenna element electrically connected with the other end of said contact terminal, wherein a center axis of the coil antenna element is located on the extended line of a center axis of said linear antenna element, and the insulating member separates and electrically isolates the linear antenna element from coil antenna element;

a switch for detecting whether said antenna is in an uprightly standing state or in a restored state;

a second conductive feeding terminal allocated at a position in said main body such that the second conductive feeding terminal contacts said contact terminal when said antenna is restored;

a first impedance matching circuit connecting with said first feeding terminal;

a second impedance matching circuit connecting with said second feeding terminal;

a radio circuit for conducting radio communication; and a change-over circuit for connecting selectively, when said switch detects that said antenna is in said uprightly standing state, said radio circuit with said first impedance matching circuit to allow said radio circuit to supply power to said first feeding terminal via said first impedance matching circuit, and for connecting selectively, when said switch detects that said antenna is in said restored state, said radio circuit with said second impedance matching circuit to allow said radio circuit to supply power to said second feeding terminal via said second impedance matching circuit.

5. A mobile radio machine, according to claim 4, wherein:

said switch is of such structure that, when said antenna is restored, said switch becomes on by pressure pushed by a part of said antenna against its actuator, and when said antenna stands uprightly, said switch becomes off by release of said pushing pressure against said actuator.

6. A mobile radio machine, according to claim 4, wherein:

said main body of radio machine is that of a folding type radio machine, and said rotating shaft rotates so that said antenna is restored in a direction parallel to the direction of a folding axis of said radio machine.

7. A mobile radio machine with a lay-able type antenna enabled to stand uprightly and be put in a main body of said radio machine around a rotating shaft provided on a part of said main body, said radio machine comprising:

an antenna which is said lay-able type antenna comprising a first conductive feeding terminal provided with said rotating shaft at an end of the first conductive feeding terminal, a linear antenna element connected at one end of said linear antenna element with said first conductive feeding terminal, an insulating member connected atone end of said insulating member with the other end of said linear antenna element, a conductive contact terminal having one end of the conductive contact terminal connected with the other end of said insulating member, and a meander-line-like inductance element electrically connected with the other end of said contact terminal, wherein a center axis of said meander-line-like inductance element is located on the extended line of center axis of said linear antenna element, and the insulating member separates and electrically isolates the linear antenna element from the meander-line-like inductance element;

a switch for detecting whether said antenna is in an uprightly standing state or bin a restored state;

a second conductive feeding terminal allocated at a position in said main body such that the second conductive feeding terminal contacts said contact terminal when said antenna is restored;

a first impedance matching circuit connecting with said first feeding terminal;

a second impedance matching circuit connecting with said second feeding terminal;

a radio circuit for conducting radio communication; and a change-over circuit for connecting selectively, when said switch detects that said antenna is in said uprightly standing, said radio circuit with said first impedance matching circuit to allow said radio circuit to supply power to said first feeding terminal via said first impedance matching circuit, and for connecting selectively, when said switch detects that said antenna is in said restored state, said radio circuit with said second impedance matching circuit to allow said radio circuit to supply power to said second feeding terminal via said second impedance matching circuit.

8. A mobile radio machine, according to claim 7, wherein:

said switch is of such structure that, when said antenna is restored, said switch becomes on by pressure pushed by a part of said antenna against its actuator, and when said antenna stands uprightly, said switch becomes off by release of said pushing pressure against said actuator.

9. A mobile radio machine, according to claim 7, wherein:

said main body of radio machine is that of a folding type radio machine, and said rotating shaft rotates, when said antenna is restored in a direction parallel to the direction of a folding axis of said radio machine.

10. A mobile radio machine with a lay-able type antenna enabled to stand uprightly and be restored in a main body of said radio machine around a rotating shaft provided on a part of said main body, said radio machine comprising:

an antenna which is said lay-able type antenna comprising a first conductive feeding terminal provided with said rotating shaft at an end of said first conductive feeding terminal, a linear antenna element connected at one end of said linear antenna element with said first conductive feeding terminal, an insulating member connected at one end of the insulating member with an other end of said linear antenna element, a conductive contact terminal having one end of the conductive contact terminal connected with the other end of said insulating member, and a coil antenna element electrically connected with the other end of said contact terminal, wherein a center axis of said coil antenna element is located on the extended line of center axis of said linear antenna element, and the insulating member separates and electrically isolates the linear antenna element from the coil antenna element;

a second conductive feeding terminal allocated at a position in said main body such that the second conductive feeding terminal contacts said contact terminal when said antenna is restored;

a first impedance matching circuit connected with at least said first feeding terminal;

a second impedance matching circuit connected with at least said second feeding terminal;

a radio circuit for making radio communication; and a switch for connecting selectively, when said antenna is detected in an uprightly standing state, said radio circuit with said first impedance matching circuit to allow power to be supplied via said first impedance matching circuit to said first feeding terminal, and for connecting selectively, when said antenna is detected in a restored state, said radio circuit with said second impedance matching circuit to allow power to be supplied via said second impedance matching circuit to said second feeding terminal.

11. A mobile radio machine, according to claim 10, wherein:

said switch is of such structure that, when said antenna is restored, said switch becomes on by pressure pushed by a part of said antenna against its actuator, and when said antenna stands uprightly, said switch becomes off by release of said pushing pressure against said actuator.

12. A mobile radio machine, according to claim 10, wherein:

said main body of radio machine is that of a folding type radio machine, and said rotating shaft rotates so that said antenna is restored in a direction parallel to the direction of a folding axis of said radio machine.

13. A mobile radio machine with a lay-able type antenna enabled to stand uprightly and be restored in a main body of said radio machine around a rotating shaft provided on a part of said main body, said radio machine comprising:

an antenna which is said lay-able type antenna comprising a first conductive feeding terminal provided with said rotating shaft at an end of said first conductive feeding terminal, a linear antenna element connected at one end of the linear antenna element with said first conductive feeding terminal, an insulating member connected at one end of said insulating member with the other end of said linear antenna element, a conductive contact terminal having one end of the conductive contact terminal connected with one end of said insulating member, and a meander-line-like inductance element electrically connected with the other end of said contact terminal, wherein a center axis of the meander-line-like inductance element is located on the extended line of center axis of said linear antenna element, and the insulating member separates and electrically insolates the linear antenna element from the meander-line-like inductance element;

a second conductive feeding terminal allocated at a position in said main body such that the second conductive feeding terminal contact said contact terminal when said antenna is restored;

a first impedance matching circuit connected with at least said first feeding terminal;

a second impedance matching circuit connected with at least said second feeding terminal;

a radio circuit for making radio communication; and a switch for connecting selectively, when said antenna is detected in an uprightly standing state, said radio circuit with said first impedance matching circuit to allow power to be supplied via said first impedance matching circuit to said first feeding terminal, and for connecting selectively, when said antenna is detected in a restored state, said radio circuit with said second impedance matching circuit to allow power to be supplied via said second impedance matching circuit to said second feeding terminal.

14. A mobile radio machine, according to claim 13, wherein:

said switch is of such structure that, when said antenna is restored, said switch becomes on by pressure pushed by a part of said antenna against its actuator, and when said antenna stands uprightly, said switch becomes off by release of said pushing pressure against said actuator.

15. A mobile radio machine, according to claim 13, wherein:

said main body of radio machine is that of a folding type radio machine, and said rotating shaft rotates so that said antenna is restored in a direction parallel to the direction of a folding axis of said radio machine.

* * * * *